United States Patent
Bahl et al.

(10) Patent No.: US 8,626,799 B2
(45) Date of Patent: Jan. 7, 2014

(54) MAPPING DATA STRUCTURES

(75) Inventors: Rohit Bahl, Ottawa (CA); Eric O. Funk, Kanata (CA); Alan Yeung, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/251,858

(22) Filed: Oct. 3, 2011

(65) Prior Publication Data

US 2013/0086124 A1 Apr. 4, 2013

(51) Int. Cl.
*G06F 17/30* (2006.01)

(52) U.S. Cl.
USPC .......................................................... 707/802

(58) Field of Classification Search
USPC .......................................................... 707/802
See application file for complete search history.

(56) References Cited

U.S. PATENT DOCUMENTS

| | | | |
|---|---|---|---|
| 6,678,867 B2 | 1/2004 | Fong et al. | |
| 6,772,180 B1 | 8/2004 | Li et al. | |
| 7,043,687 B2 | 5/2006 | Knauss et al. | |
| 7,146,474 B2 * | 12/2006 | Nguyen et al. | 711/162 |
| 7,181,739 B1 * | 2/2007 | Harral et al. | 717/176 |
| 7,219,104 B2 * | 5/2007 | Lang et al. | 707/661 |
| 7,225,411 B1 * | 5/2007 | Stoner et al. | 715/760 |
| 7,269,701 B2 * | 9/2007 | Shackelford et al. | 711/162 |
| 7,281,211 B2 | 10/2007 | Jeannette et al. | |
| 7,483,870 B1 * | 1/2009 | Mathew et al. | 1/1 |
| 7,526,503 B2 | 4/2009 | Bernstein et al. | |
| 7,574,652 B2 * | 8/2009 | Lennon et al. | 715/248 |
| 7,586,926 B2 * | 9/2009 | Fritsch et al. | 370/401 |
| 7,698,634 B2 * | 4/2010 | Bhatia et al. | 715/239 |
| 7,739,223 B2 | 6/2010 | Vaschillo et al. | |
| 7,743,385 B2 * | 6/2010 | Debruin et al. | 719/313 |
| 7,774,831 B2 * | 8/2010 | Kuznetsov et al. | 726/12 |
| 7,788,214 B2 * | 8/2010 | Fernandez et al. | 707/602 |
| 7,822,708 B1 * | 10/2010 | Mathew et al. | 707/610 |
| 7,827,205 B2 * | 11/2010 | Okunseinde et al. | 707/802 |
| 7,840,895 B2 * | 11/2010 | Bhatia et al. | 715/239 |
| 7,853,553 B2 * | 12/2010 | Lankinen et al. | 707/602 |
| 7,873,899 B2 * | 1/2011 | Singh | 715/234 |
| 7,900,136 B2 * | 3/2011 | Iwasaki | 715/237 |
| 7,926,064 B2 * | 4/2011 | Fernandez et al. | 719/313 |
| 7,953,102 B2 * | 5/2011 | Fritsch et al. | 370/401 |
| 8,185,911 B2 * | 5/2012 | Goring et al. | 719/313 |
| 8,266,630 B2 * | 9/2012 | Araujo et al. | 719/310 |
| 2002/0184213 A1 * | 12/2002 | Lau et al. | 707/6 |
| 2007/0299975 A1 * | 12/2007 | Daschakowsky et al. | 709/228 |
| 2010/0153464 A1 | 6/2010 | Jalaldeen | |
| 2012/0072541 A1 * | 3/2012 | Carls et al. | 709/219 |

OTHER PUBLICATIONS

P. Atzeni et al., "Model-Independent Schema and Data Translation," 2006, 18 pages.

* cited by examiner

*Primary Examiner* — Sheree Brown
(74) *Attorney, Agent, or Firm* — Cantor Colburn LLP

(57) ABSTRACT

A method for transforming data structures includes processing a portion of a source data structure (SDS) with a first processing resource by associating the first processing resource with a target data structure (TDS) key element located in a key position of a queue, determining whether the queue includes an SDS node element corresponding to the key position, processing the SDS node element responsive to determining that the queue includes the SDS node element corresponding to the key position, wherein the processing the SDS node element comprises retrieving the SDS node element from the queue, processing the retrieved SDS node element to generate a resultant TDS node element, outputting the resultant TDS node element to an empty key position in the queue, and mapping the resultant TDS node element to the TDS.

22 Claims, 27 Drawing Sheets

```
42    private ThreadPoolManager() {
43        blockingQ = new ConcurrentQueue();
44
45        for (int i = 0; i < fastThreadSize; i++) {
46            Thread thread = new Thread(new PriorityThread(this),
47                    "Concurrent Transform - " + i); //$NON-NLS-1$
48            fastSlaves.add(thread);
49            thread.start();
50
51        }
52
53        for (int i = 0; i < slowThreadSize; i++) {
54            InterruptableThread thread = new InterruptableThread(
55                    "Mutex Transform - " + i); //$NON-NLS-1$
56            slowSlaves.add(thread);
57            thread.start();
58
59        }
60    }
```

*FIG. 8B*

```
48      private Map<Object, LinkedList<Runnable>> smartQ;
49      private ReentrantReadWriteLock rwReLock;
50      private ReadLock rLock;
51      private WriteLock wLock;          902
52
53      public ConcurrentQueue() {
54          executingSet = Collections.synchronizedSet(new HashSet<Object>());
55          smartQ = new HashMap<Object, LinkedList<Runnable>>();
56          rwReLock = new ReentrantReadWriteLock();
57          rLock = rwReLock.readLock();
58          wLock = rwReLock.writeLock();
59
60      }                                 904
61
62      public void addToQ(Runnable r, Object contain) {
63          synchronized (contain) {
64              LinkedList<Runnable> list = findInQ(contain);
65              if (list == null) {
66                  list = new LinkedList<Runnable>();
67                  list.add(r);
68                  putToQ(contain, list);
69              } else
70                  list.add(r);
71          }
72
73      }
74
```

*FIG. 9B*

```
75    public Runnable removeFromQ(Object contain) {
76        synchronized (contain) {
77            final LinkedList<Runnable> list = findInQ(contain);
78            if (list != null) {
79                if (!list.isEmpty())
80                    return list.removeFirst();
81                else {
82                    takeFromQ(contain);
83                    executingSet.remove(contain);
84                }
85            }
86        }
87        return null;
88    }
```

*FIG. 9C*

```
90   public void executeTask(RunEntity rEntity, AtomicInteger actvCount) {
91       Object container = rEntity.container;
92       Runnable r = null;
93       if (container != null) {
94           r = removeFromQ(container);
95           rEntity.work = r;
96           if (r != null)
97               return;
98           else
99               rEntity.container = null;
100      }
101      rLock.lock();
102      for (Object c : smartQ.keySet()) {
103          if (executingSet.add(c)) {
104              rLock.unlock();
105              r = removeFromQ(c);
106              assert (r != null);
107              rEntity.container = c;
108              rEntity.work = r;
109              return;
110          }
111
112      }
113      rLock.unlock();
114      synchronized (this) {
115          try {
116              actvCount.getAndDecrement();
117              this.wait();
118          } catch (InterruptedException e) {
119              e.printStackTrace();
120          }
121          finally{
122              actvCount.getAndIncrement();
123          }
124      }
125  }
```

*FIG. 9D*

```
128    private LinkedList<Runnable> findInQ(Object contain) {                    /* 910 */
129
130        rLock.lock();
131        LinkedList<Runnable> list = smartQ.get(contain);
132        rLock.unlock();
133        return list;
134    }
135                                    /* 912 */
136    private void takeFromQ(Object contain) {
137        wLock.lock();
138        smartQ.remove(contain);
139        wLock.unlock();
140
141    }
142                                    /* 914 */
143    private void putToQ(Object contain, LinkedList<Runnable> list) {
144        wLock.lock();
145        smartQ.put(contain, list);
146        wLock.unlock();
147        synchronized (this) {
148            this.notify();
149        }
150
151    }
152                                    /* 916 */
153    public void awaitQueueEmpty(){
154        while(!executingSet.isEmpty() || !smartQ.isEmpty()){
155            try {
156                Thread.sleep(100);
157            } catch (InterruptedException e) {
158                e.printStackTrace();
159            }
160        }
161    }
162
163 }
```

*FIG. 9E*

```
41    synchronized private void process() {
42        while (true) {
43            try {
44                if (!Thread.interrupted()) {
45                    wait();
46
47                    // Notified that work is there , but checking if told to
48                    // cancel
49                    // work
50                    if (!workCancelled) {
51                        // Task executed if work available and was not canceled,
52                        task.run();
53                    } else {
54                        workCancelled = false;
55                    }
56                }
57            } catch (InterruptedException e) {
58                // Interrupt caused to cancel work while in waiting state
59                if (task == null){
60                    workCancelled = true;
61                }
62                else{
63                    workCancelled = false;
64                }
65            } catch (Exception e){
66                e.printStackTrace();
67            }
68            finally {
69                // task null since because of first interrupt above , prior to
70                // which task was already cleaned.
71                if (task != null) {
72                    workCancelled = false;
73                    task = null;
74                    final SelectiveThreadingHandler tmp = stHandler;
75                    stHandler = null;
76                    // Ensures that the worker is release back to the pool
77                    tmp.signalDone();
78                }
79            }
80        }
81
82    }
```

*FIG. 10B*

```
29   synchronized void setAndRun(Runnable r, SelectiveThreadingHandler handler) {
30       task = r;
31       stHandler = handler;
32       // Notifying waiting thread that work is ready
33       notify();
34   }
```
↗ 1004

*FIG. 10C*

```
39   public void selectiveExec(List<Runnable> nestedTransformTasks) {     /*1102
40
41       int size = 0;
42       if (nestedTransformTasks == null
43               || (size = nestedTransformTasks.size()) == 0)
44           return;
45
46       slaveThreads = threadPoolManager.getThrottleableWorkers(size);
47
48       if (slaveThreads == null) {
49           count = flagNonConcurrency;
50           for (Runnable r : nestedTransformTasks)
51               r.run();
52       } else {
53           doneThreads.clear();
54           count = size;
55
56           int i = 0;
57           for (InterruptableThread t : slaveThreads)
58               t.setAndRun(nestedTransformTasks.get(i++), this);
59
60           waitIfNecessary();
61
62       }
63
64   }
```

*FIG. 11B*

```
66  synchronized public void cancelOtherMutexRunners() {                    ╱1104
67      if(slaveThreads == null)
68          return;
69      // If another thread satisfies the condition (breaking mutex contract) , ensure that
70      // it is not allowed to start interrupting.
71      if (Thread.interrupted())
72          return;
73
74      Thread me = Thread.currentThread();
75      // Priviliged thread to run to completion and cancel everybody else.
76      for (InterruptableThread wastefulSlaveThread : slaveThreads) {
77          if (me == wastefulSlaveThread || doneThreads.contains(wastefulSlaveThread))
78              continue;
79
80          // It is possible that the thread being interrupted has already done the work,
81          // or for that matter has not even received the work order yet.
82          wastefulSlaveThread.interrupt();
83      }
84
85  }
```

*FIG. 11C*

MAPPING DATA STRUCTURES

BACKGROUND

The present invention relates to mapping data structures, and more specifically, to mapping data structures in a parallel processing system.

Data structures often include an arrangement of data elements that may be, for example, arranged as nodes in a hierarchical scheme. An example of such a data structure is an enterprise model. Mapping is used when a data structure in one domain or format is converted into another domain or format. The mapping is often performed by a processor system that receives a source data structure, processes the elements of the source data structure to transform the elements into a target data structure, and outputs the target data structure. For example, a user may input a source data structure such as a unified modeling language (UML) data structure, and the system may process the UML data structure to transform the UML data structure into an eclipse modeling framework (EMF) data structure. The processing of large data structures often consumes considerable processing resources and considerable processing time.

BRIEF SUMMARY

According to one embodiment of the present invention a method for transforming data structures includes processing a portion of a source data structure (SDS) with a first processing resource by associating the first processing resource with a target data structure (TDS) key element located in a key position of a queue, determining whether the queue includes an SDS node element corresponding to the key position, processing the SDS node element responsive to determining that the queue includes the SDS node element corresponding to the key position, wherein the processing the SDS node element comprises retrieving the SDS node element from the queue, processing the retrieved SDS node element to generate a resultant TDS node element, outputting the resultant TDS node element to an empty key position in the queue, mapping the resultant TDS node element to the TDS, determining whether the queue includes a second SDS node element corresponding to the key position, and processing the second SDS node element responsive to determining that the queue includes the second SDS node element corresponding to the key position.

According to another embodiment of the present invention a system for transforming data structures includes a queue including target data structure (TDS) key positions and source data structure (SDS) element positions associated with the TDS key positions, a first processing resource operative to process a portion of a source data structure (SDS) with a first processing resource by associating the first processing resource with a target data structure (TDS) key element located in a key position of a queue, determining whether the queue includes an SDS node element corresponding to the key position, processing the SDS node element responsive to determining that the queue includes the SDS node element corresponding to the key position, wherein the processing the SDS node element comprises retrieving the SDS node element from the queue, processing the retrieved SDS node element to generate a resultant TDS node element, outputting the resultant TDS node element to an empty key position in the queue, mapping the resultant TDS node element to the TDS, determining whether the queue includes a second SDS node element corresponding to the key position, and processing the second SDS node element responsive to determining that the queue includes the second SDS node element corresponding to the key position.

According to yet another embodiment of the present invention a method for processing a request for a transform rule includes receiving a request from a processing resource, the request including an identifier of an SDS element type and an identifier of the requesting processing resource, processing the request with a second processing resource and a third processing resource, the second processing resource is associated with a first list of transform rules and the third processing resource is associated with a second list of transform rules, wherein the processing includes the second processing resource determining whether the first list of transform rules includes an SDS element type matching the received SDS element type, the second processing resource sending a transform rule associated with the SDS element type to the requesting processing resource, and a indicator to the third processing resource indicating that the request has been satisfied responsive to determining that the first list of transform rules includes the SDS element type matching the received SDS element type, the third processing resource determining whether the second list of transform rules includes an SDS element type matching the received SDS element type, and the third processing resource sending a transform rule associated with the SDS element type to the requesting processing resource, and a indicator to the second processing resource indicating that the request has been satisfied responsive to determining that the second list of transform rules includes the SDS element type matching the received SDS element type.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8B illustrates an exemplary embodiment of the ThreadPoolManager ( ) function of FIG. 8A.

FIG. 9B illustrates an exemplary embodiment of the ConcurrentQueue ( ) function of FIG. 9A.

FIG. 9C illustrates an exemplary embodiment of the removeFromQ ( ) function of FIG. 9A.

FIG. 9D illustrates an exemplary embodiment of the executeTask ( ) function of FIG. 9A.

FIG. 9E illustrates an exemplary embodiment of the findInQ ( ) function, the takeFromQ ( ) function, putToQ ( ) function, and awaitQueueEmpty ( ) function of FIG. 9A.

FIG. 10B illustrates an exemplary embodiment of the process ( ) function of FIG. 10A.

FIG. 10C illustrates an exemplary embodiment of the setAndRun ( ) function of FIG. 10A.

FIG. 11B illustrates an exemplary embodiment of the selctiveExec ( ) function of FIG. 11A.

FIG. 11C illustrates an exemplary embodiment of the cancelOtherMutexRunners ( ) function of FIG. 11A.

DETAILED DESCRIPTION

Figure 1:
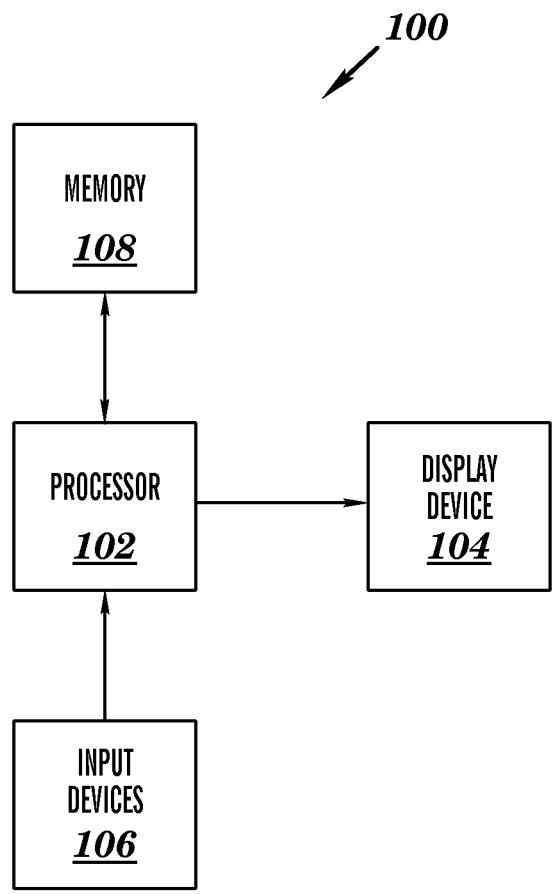
FIG. 1 illustrates an exemplary embodiment of a system.

FIG. 1 illustrates an exemplary embodiment of a system 100. The system 100 includes a processor 102 that is communicatively connected to a display device 104, input devices 106 and a memory device 108. In the illustrated embodiment, the processor 102 may include a processor that performs processing tasks in parallel such as, for example, a dual or quad core processor.

Figure 2:
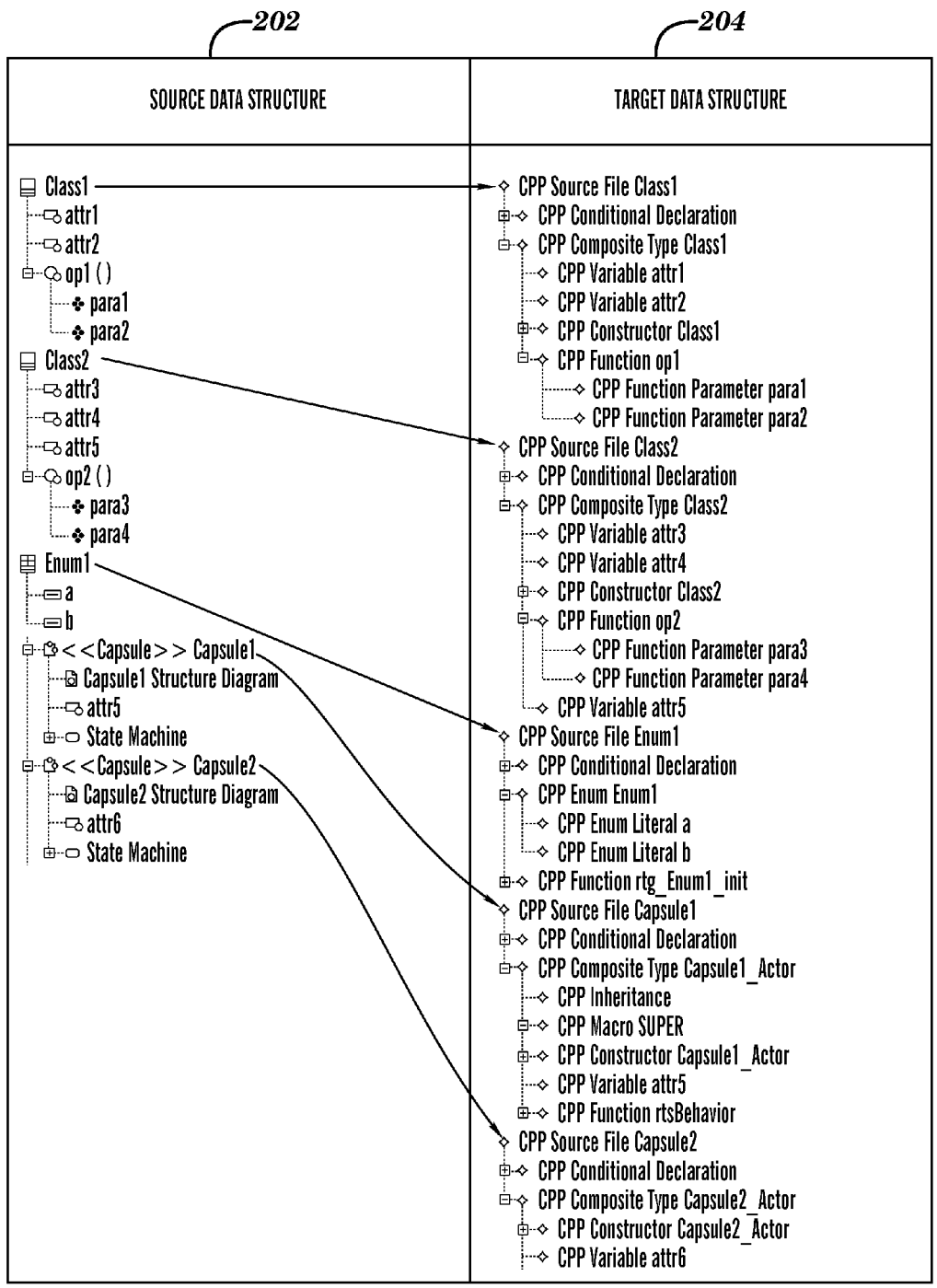
FIG. 2 illustrates an example of a source data structure and a target data structure.

FIG. 2 illustrates an example of a source data structure 202 and a target data structure 204. The source data structure 202 includes a number of elements arranged as nodes in a hierarchical structure. The target data structure 204 includes transformed elements of the source data structure 202 that are mapped to the target data structure 204 and correspond to elements of the source data structure 202. In the illustrated example, the source data structure 202 is a UML data structure while the target data structure is a type of EMF data structure. In the illustrated example, the "Class1" element node of the source data structure 204 has been transformed and mapped to the target data structure 204 as the element nodes "CPP Source File Class1;" "CPP Conditional Declaration;" and "CPP Composite Type Class." The source data structure 202 includes the element nodes "attr1" and "attr2" connected to and arranged in a lower level of the hierarchy to the "Class1" element node. Thus, "attr1" is transformed to "CPP Variable attr1" and mapped to a hierarchal position in the target data structure 204 that corresponds to the hierarchal position of the "attr1" element in the source data structure 202 (i.e. connected to and at a lower level of the hierarchy of the "CPP Composite Type Class1" element node in the target data structure 204).

Though the description of the exemplary embodiments of the methods and systems described below will use the exemplary source data structure 202 and target data structure 204, the example is for illustrative purposes only. The methods and systems described below may be used to map any type of source data structure to any type of target data structure and are not limited by the example data structures illustrated in FIG. 2. Mapping may include, for example, data transformations, exports, imports and translations.

Previous methods for mapping a source data structure to a target data structure were designed to be used with a single processing resource. The methods and systems described below allow the mapping of data structures to be performed more efficiently using parallel processing resources. The use of parallel processing resources allows different elements of the source data structure to be transformed and mapped in parallel while maintaining the integrity of the resultant target data structure.

FIGS. 3A-3G illustrate an exemplary embodiment of an arrangement of processing resources 302 that include virtual processors (VP) A-D (302A-302D) that may perform processing tasks simultaneously and in parallel. In the illustrated embodiment the processing resources 302 may be located in the processor 102 (of FIG. 1); however, the processing resources 302 may be located in any combination or arrangement of a plurality of processors that may be located in different locations and communicatively connected to the memory device 108 or a number of different communicatively connected memory devices 108. Though the illustrated exemplary embodiment includes four virtual processors the methods and systems described below may include any number of virtual or real processors capable of performing processing tasks simultaneously and in parallel. The illustrated embodiment includes a concurrent queue (queue) 304. The queue 304 may be stored in the memory device 108. The queue 304 is multidimensional and expandable. In the illustrated exemplary embodiment of FIG. 3A, the queue 304 includes key level 306 that includes a key position 306A that stores a target data structure (TDS) element key. The queue 304 includes tasks corresponding to the transformation of source data structure (SDS) element level 308 that may include any number of including zero of SDS elements that are associated with the TDS element stored in the corresponding key position. In the illustrated example of FIG. 3A, the SDS element level 308 includes SDS elements stored in SDS element positions 308A1-308A5 that correspond to the position 306A. The processing resources 302A-302D may retrieve a task associated with the SDS element level 308 such that transformation agents associated with the corresponding SDS elements are executed by the processing resources 302A-302D. The processing resources 302A-302D store data from and to any key position in the key level 306 and the corresponding SDS element level 308 in the queue 304.

The FIGS. 3A-3G will be used to describe an exemplary method of operation of the system 100 (of FIG. 1) to map a portion of the source data structure (SDS) 202 (of FIG. 2) to a corresponding portion of the target data structure (TDS) 204. In this regard, referring to FIG. 2A, once the SDS 202 has been received by one of the processing resources 302, the root node element of the SDS 202 is identified and transformed into a corresponding root node element in the TDS 204. The TDS root node element is mapped to the TDS 204 and stored in a file that will contain the TDS 204, and the TDS root node element is stored in the key level 306 of the queue 304. In the illustrated example, the TDS root node element is stored in the key position 306A. The processing resource 302 also uses the root node element of the SDS 202 to identify the SDS elements that are arranged in nodes connected to the root node element in the SDS 202 hierarchy (e.g., "Class1," "Class2," "Enum1," "Capsule1," and "Capsule2"). The processing resource 302 stores the identified SDS elements in the SDS element level 308 in positions 308A1-A5. In the illustrated example, the processing resource VP 302A has performed the above described methods; however, any of the processing resources 302 may perform the above described methods.

Figure 3A:
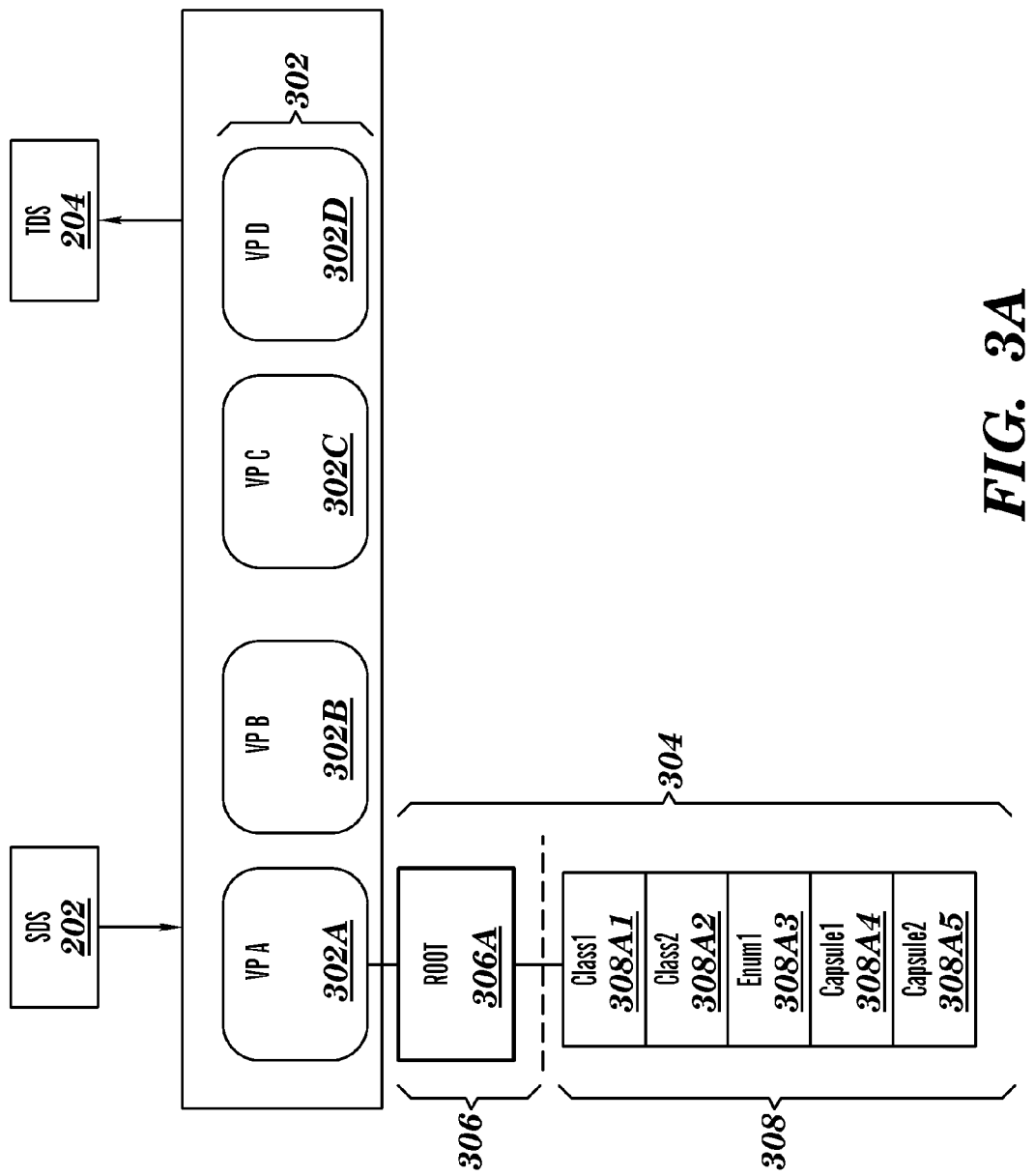
FIGS. 3A-3G illustrate an exemplary embodiment of an arrangement of processing resources.
Figure 3B:
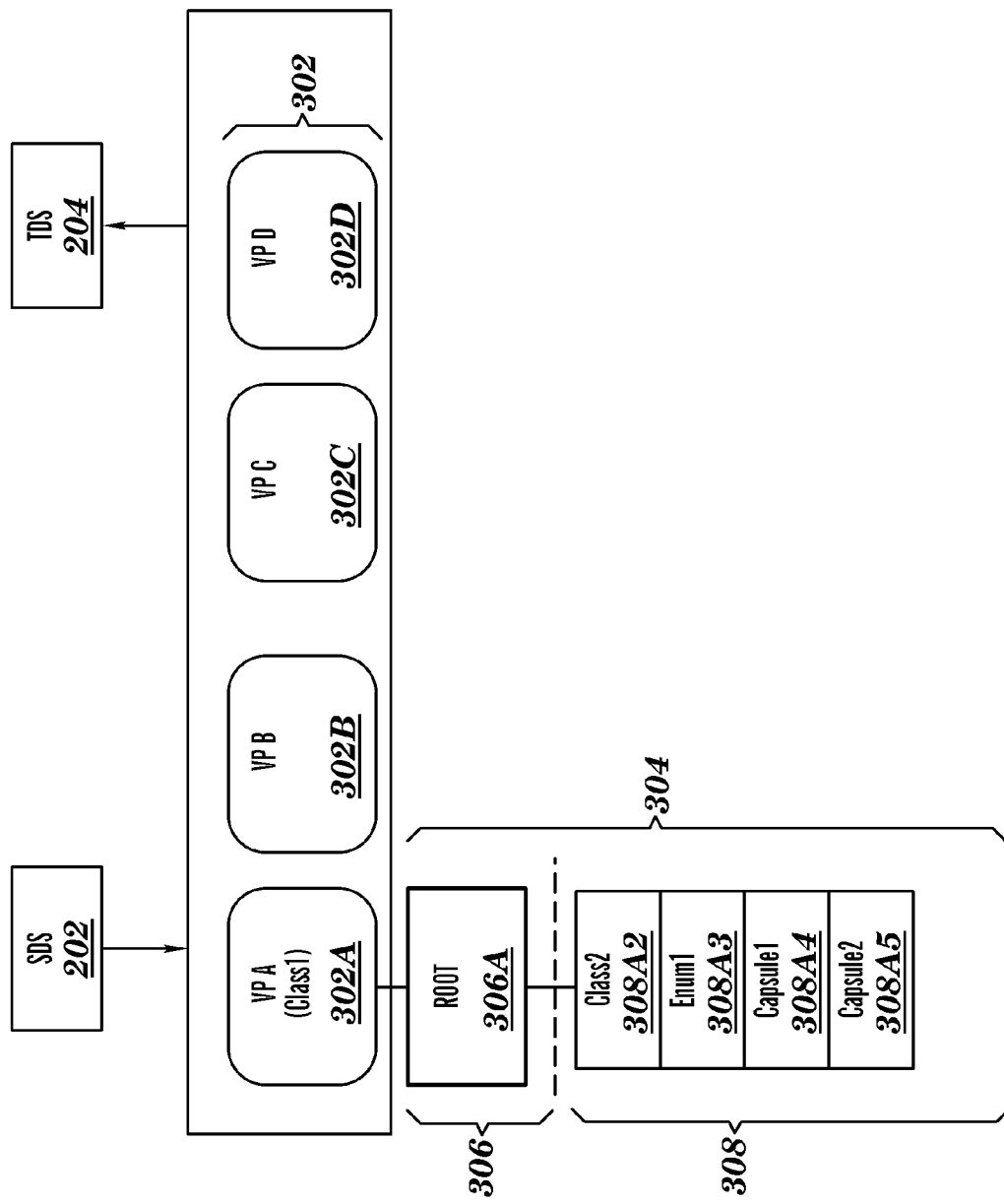
Figure 3C:
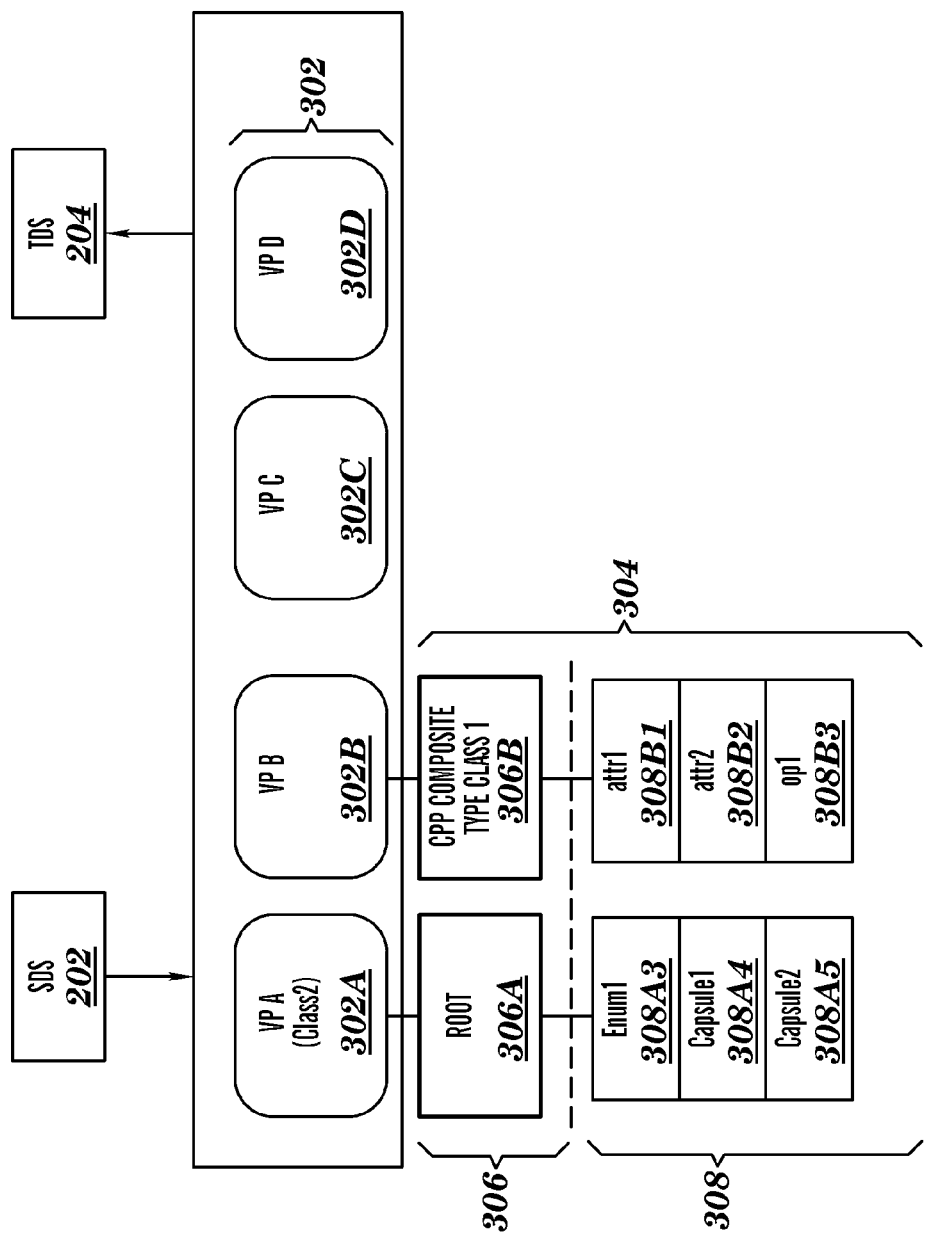

Referring to FIG. 3B, the VP 302A has retrieved the SDS element "Class1" from the queue 304, and processes the retrieved SDS element; however, any of the processing resources 302 that are idle may perform the processing task. In this regard, the processing includes identifying the type of transform that should be applied to the retrieved SDS element and applying the transform to the SDS element to generate a corresponding TDS element (e.g., "CPP Composite Type Class1" as illustrated in FIG. 2). Once the transform has been applied by the VP 302A, the VP 302A maps the generated TDS element to a position in the TDS 204 that corresponds the SDS element position. Referring now to FIG. 3C, the VP 302A refers to the SDS 202 to identify and retrieve any SDS elements that are arranged in nodes connected to the processed SDS 202 node element in the SDS 202 hierarchy (e.g., "attr1," "attr2," and "op1"). The VP 302A stores the generated TDS element "CPP Composite Type Class1" in the key level 306 of the queue 304 in a key position 306B; and stores the retrieved SDS elements in the SDS element level 308 in SDS element positions 308B1-308B3 that correspond to the key position 306B. If there are no SDS elements connected to the processed SDS node element, the VP 302A will only store the generated TDS element in the key position 306B. Once the VP A 302A has stored the generated TDS element and any retrieved SDS node elements in the queue 304, the VP A 302A will determine whether the SDS element level 308 includes any SDS elements in the SDS element positions 308A that correspond to the key position 306A. If so, the VP A 302 will retrieve and process the next SDS element (e.g., "Class2" from SDS element position 308A2) in the queue 304. If all of the SDS elements that correspond to the key position 306A have been processed, the VP A 302A will determine whether the queue 304 includes any populated key positions in the key level 308 and process any corresponding SDS elements in a similar manner as described above. Once the key position 306B and the corresponding SDS element positions 308B have been populated by the VP A 302, another processing resource 302 that is idle and thus, available, will process the SDS elements that correspond to the key position 306B. In the illustrated example of FIG. 3C, the VP A 302A has begun processing "Class2" while the VP B 302B has selected the key position 306B.

Figure 3D:
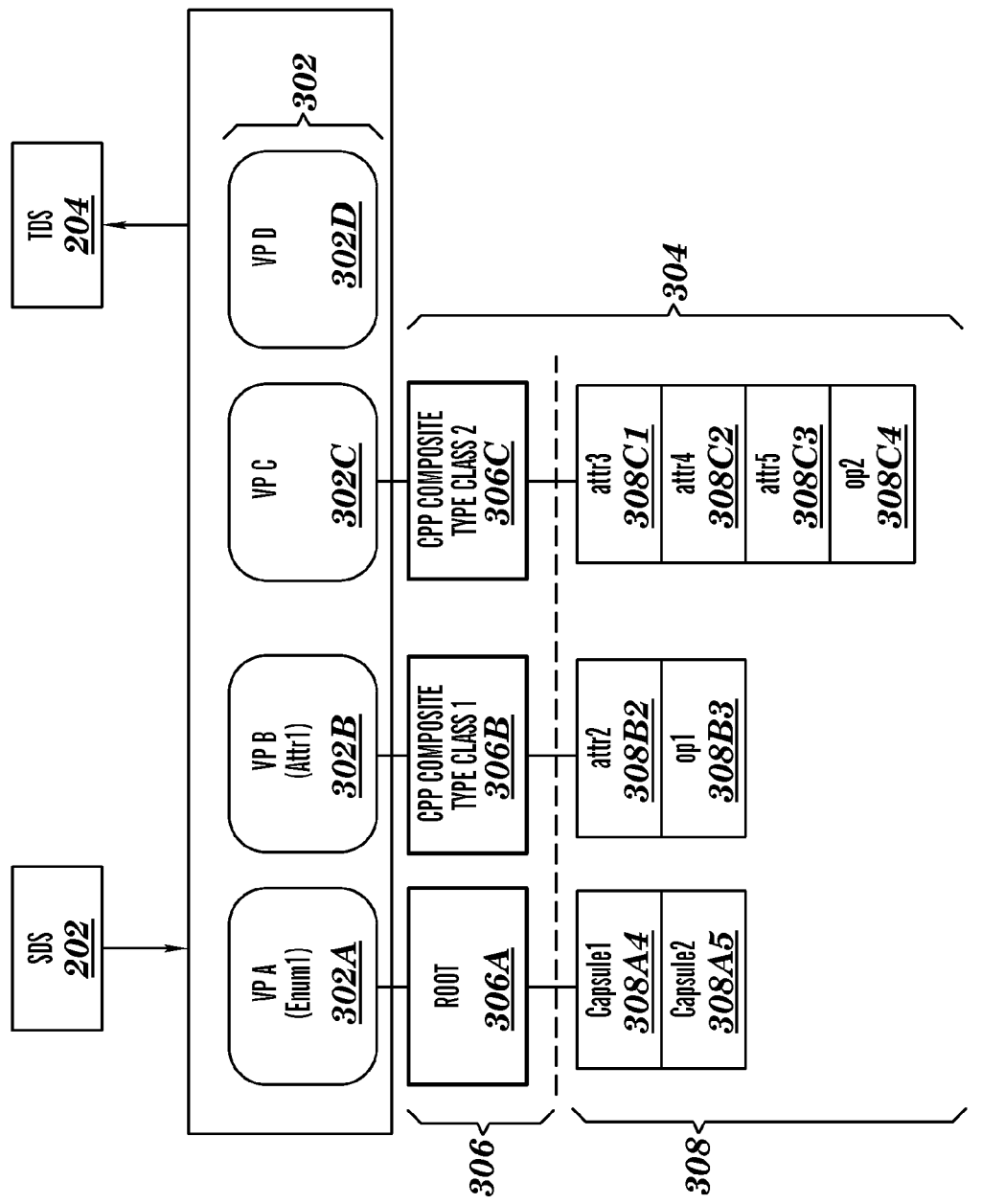

Referring to FIG. 3D, the VP B 302B has is process the "Attr1" from the SDS element position 308B1; the VP A 302A finished processing the "Class2" SDS element, populated the queue 304 with the TDS key "CPP Composite Type Class 2" in the key position 306C and the SDS elements in the SDS element positions 308C1-C4, and begun processing the SDS element "Enum1;" and the VP C 302C selects the key position 306C for processing.

Figure 3E:
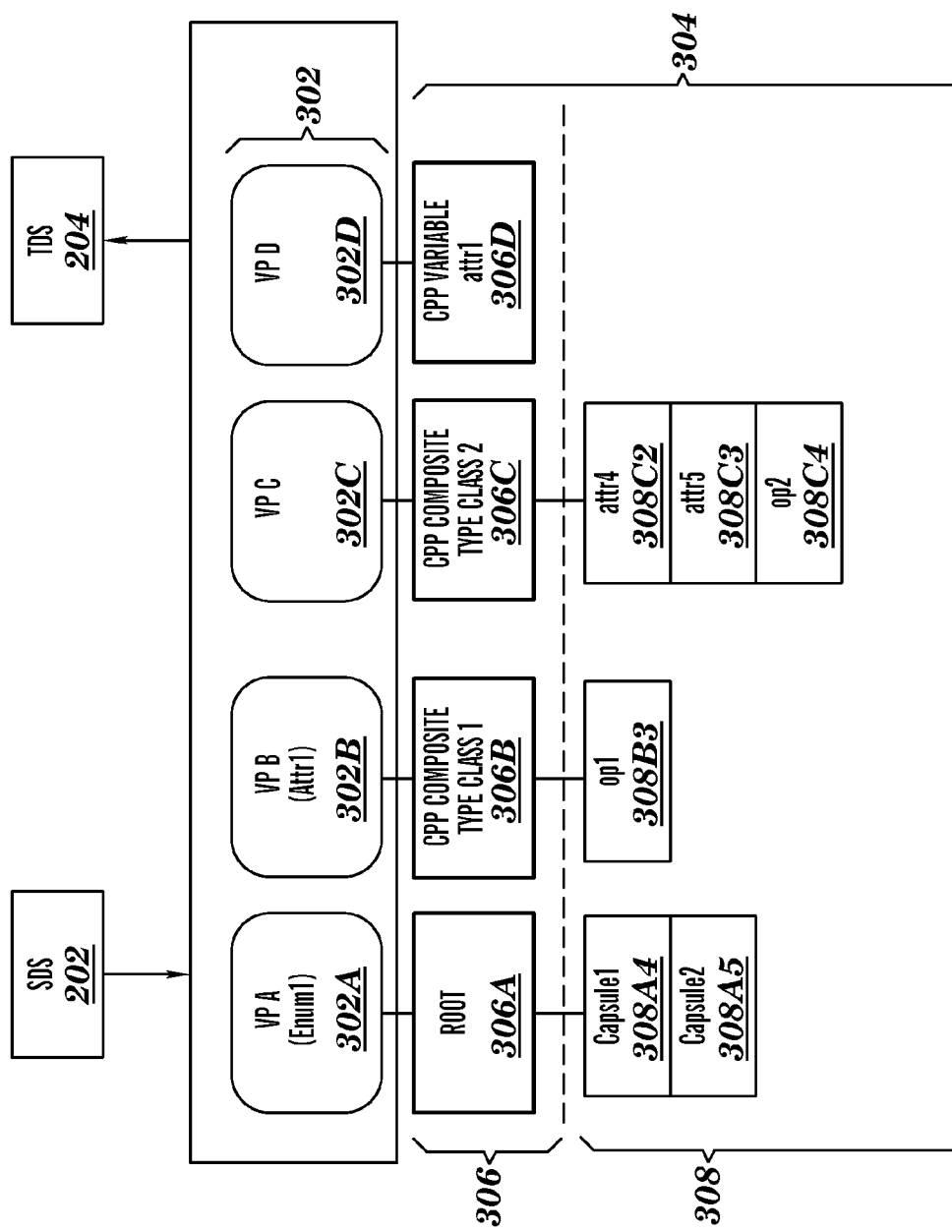

Referring to FIG. 3E, the VP C 302C has started processing the SDS element "Attr3." The VP B 302 B has completed processing "Attr1" and populated the key position 306D with the target element "CPP Variable attr1." Since the SDS element "Attr3" is not attached to any branch nodes a lower hierarchy level, the SDS element positions corresponding to the key position 306D are empty (or not indexed). The idol VP D 302D has selected the key position 306D for processing.

Figure 3F:
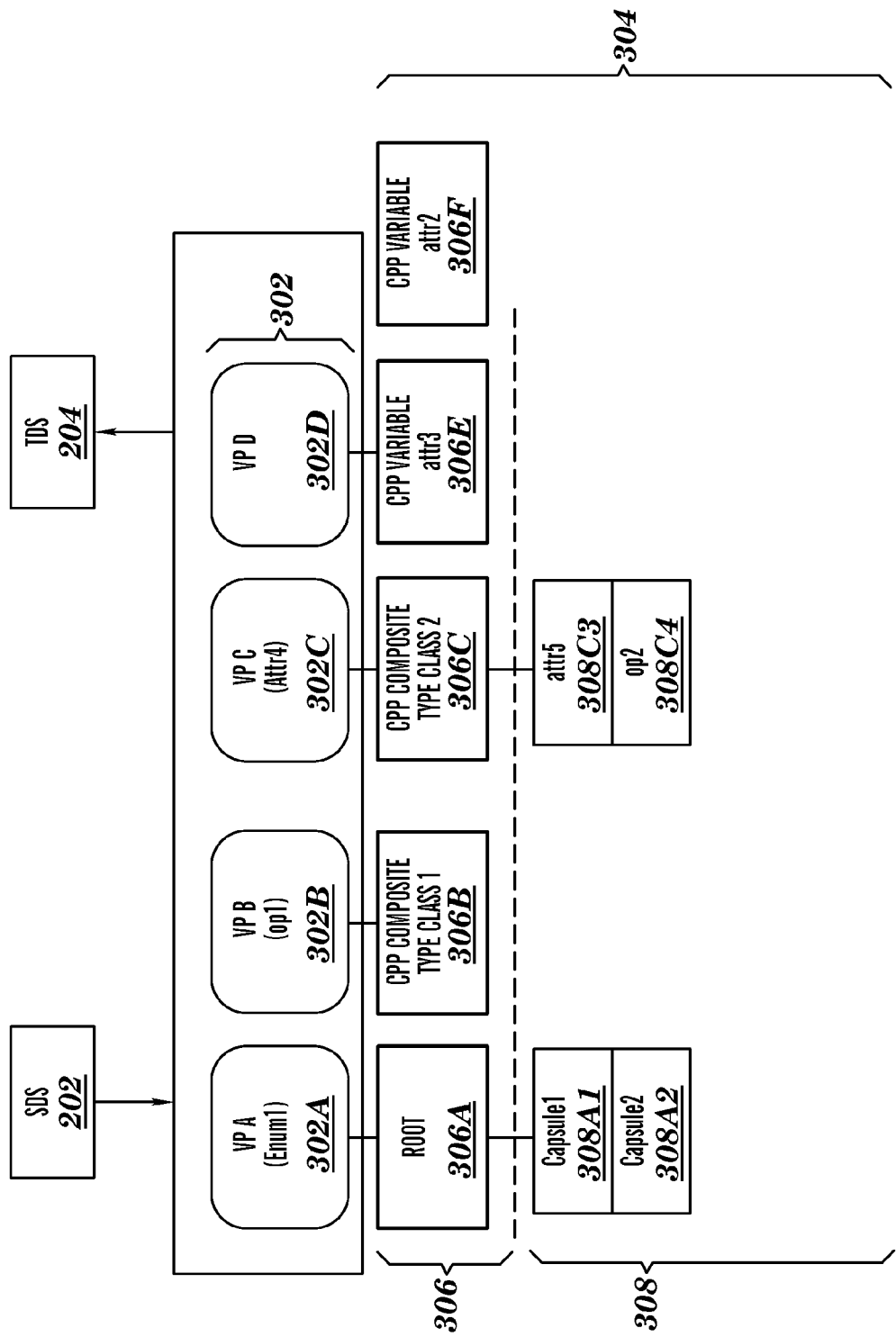

Referring to FIG. 3F, the VP C 302C has completed processing the SDS element "Attr3" and has populated the key position 306E with "CPP Variable attr3," and has started processing the SDS element "Attr4." The VP D 302D has checked to determine whether there are any SDS elements populating SDS element positions corresponding to the key position 306D (of FIG. 3E). Since there were none, the VP D 302D determined whether there were any key positions not selected by a processor 302 for processing. The VP D 302D determined that the key position 306E was not selected, and selected the key position 306E for processing. The VP B 302B completed the processing of "Attr2" and populated the key position 306F. Since the processors 302 are all occupied with processing tasks the key position 306F awaits processing in the queue 302.

Figure 3G:
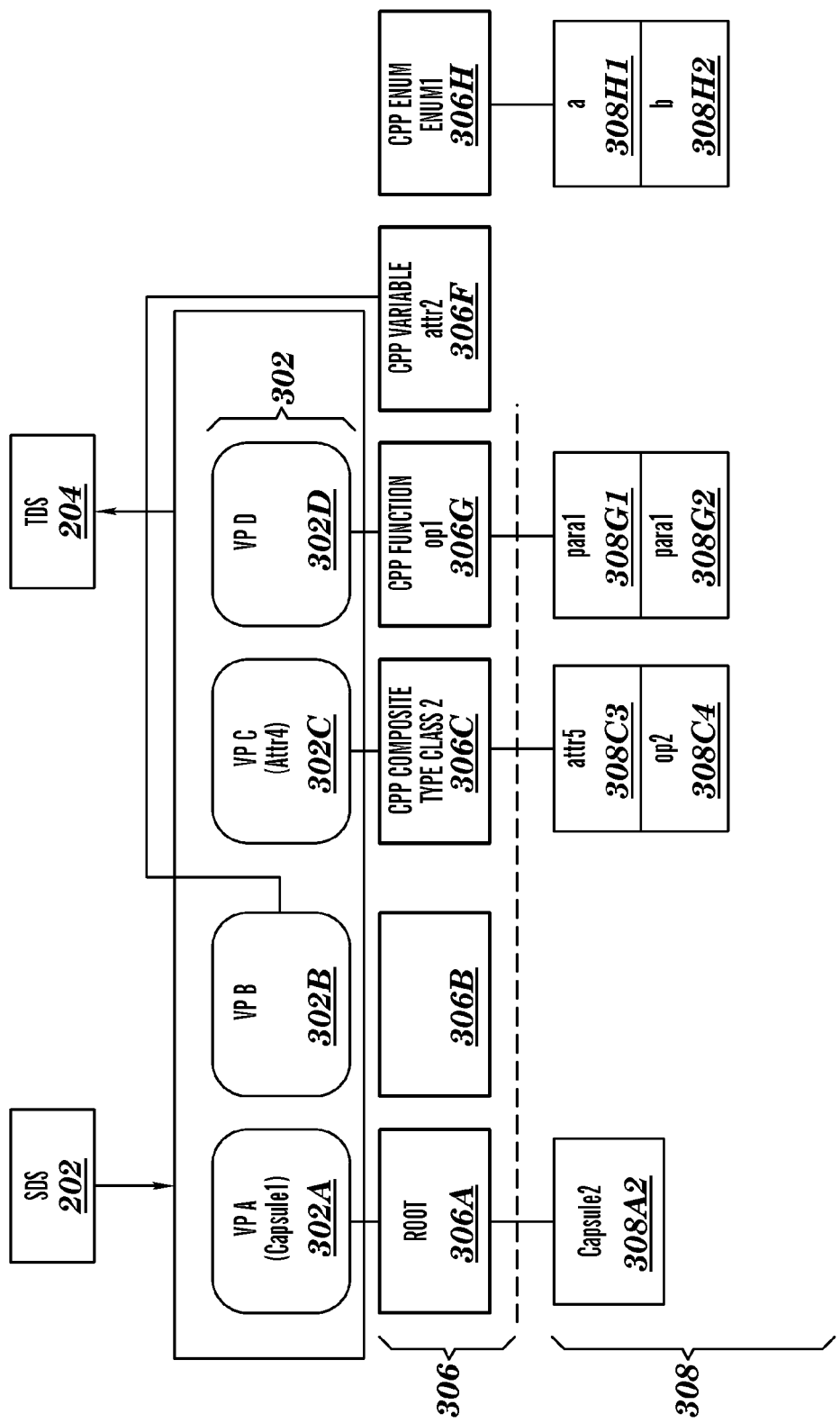

Referring to FIG. 3G, the VP B 302B completed processing the SDS element "op1" and populated the key position 306G and the SDS element positions 308G1 and 308G2. The VP B 302B determined whether there are any remaining SDS elements corresponding to the key position 306B. Since there were no remaining SDS elements, the VP B 302B expunged the key position 306B. The VP B 302B then identified the key position 306F as being unassigned to a processing resource, and began processing the key position 306F. Simultaneously VP A has completed processing and position CPP Enum Enum1 and populates it with SDS elements 308H1 and 308H2.

Figure 4A:
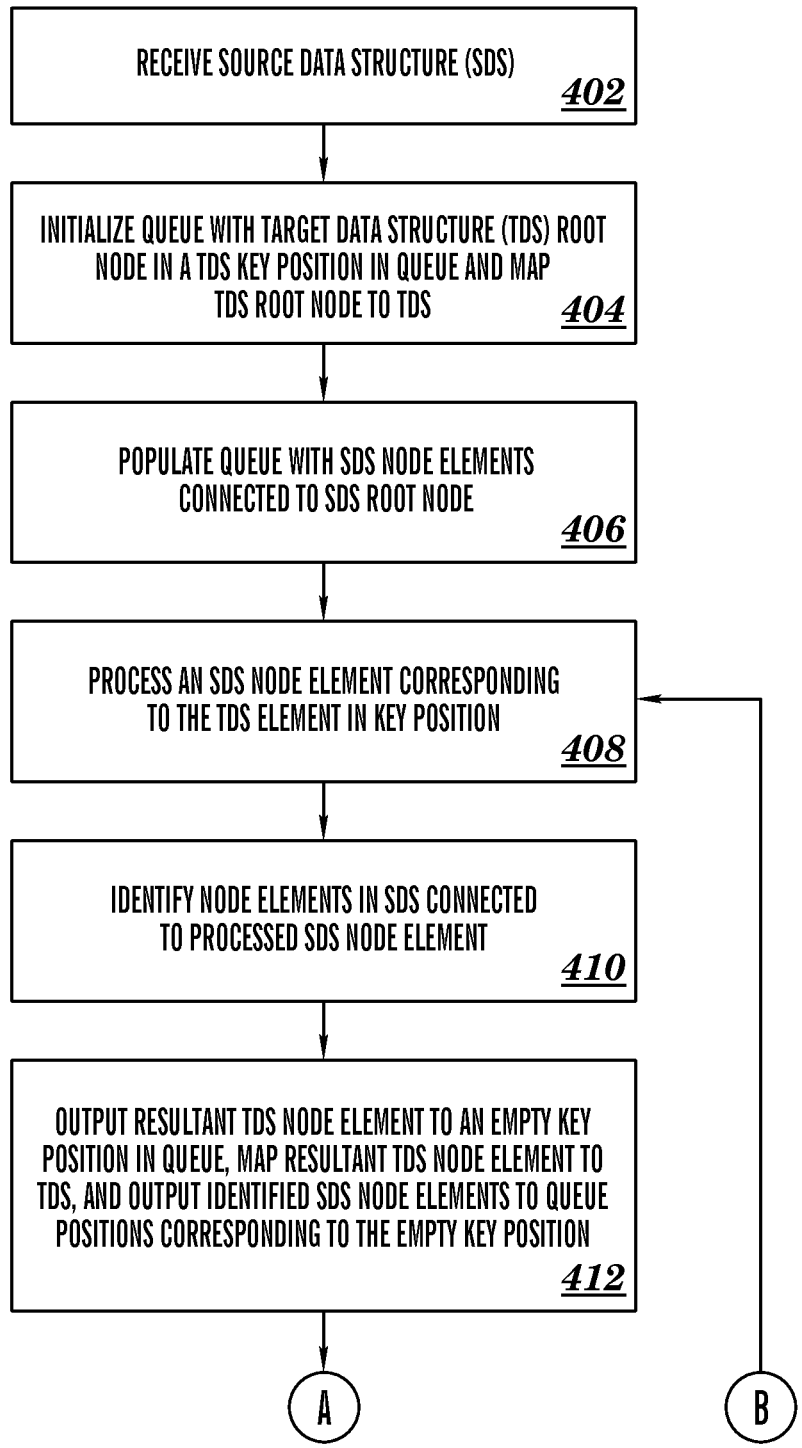
FIGS. 4A-4B illustrate a block diagram of an exemplary method for operating the system.
Figure 4B:
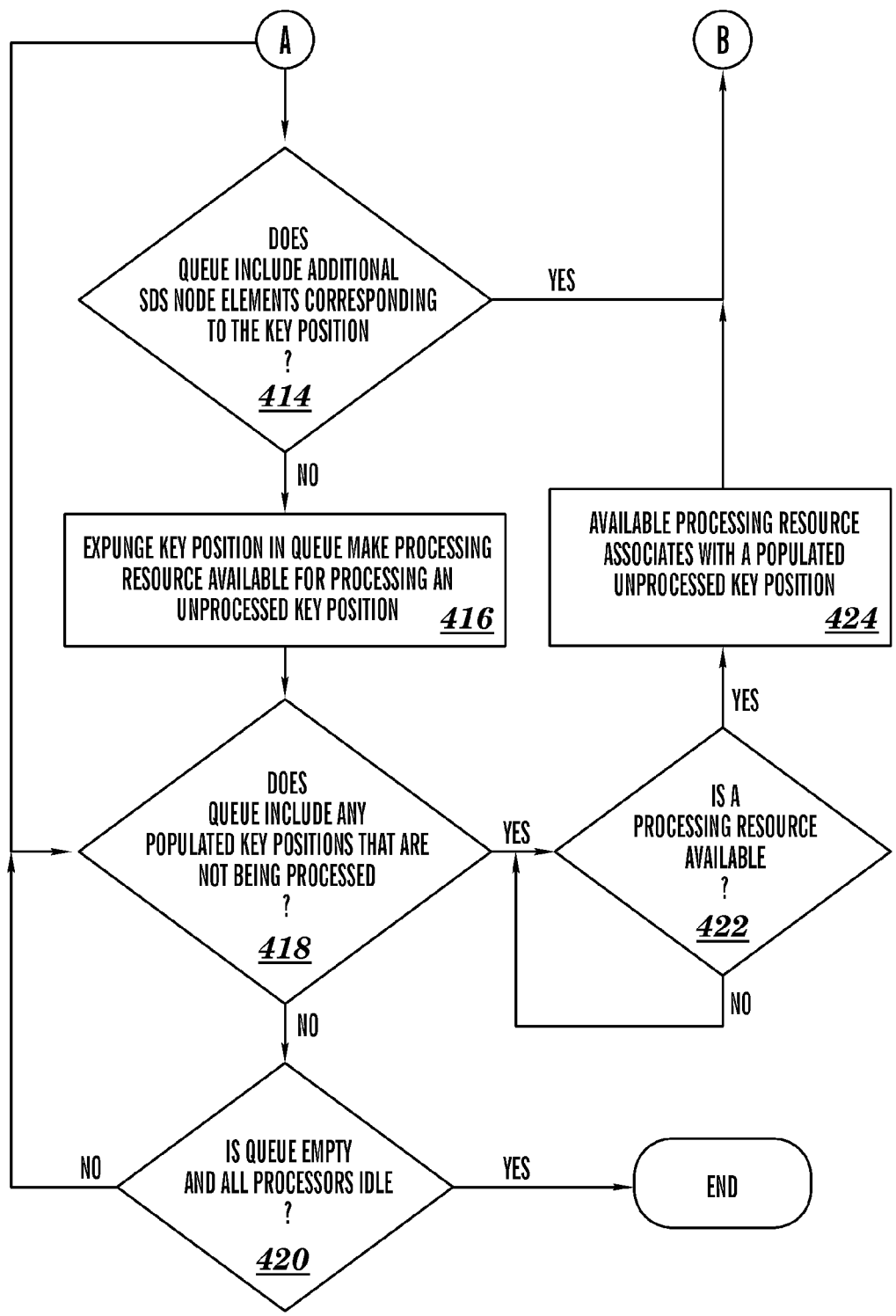

FIGS. 4A-4B illustrate a block diagram of an exemplary method for operating the system 100 described above. Referring to FIG. 4A, in block 402, an SDS is received by a processing resource. In block 404, the processing resource initializes the queue with a TDS root node in a TDS key position and maps the TDS root node to the TDS. The processing resource populates the SDS positions corresponding to the TDS key position with SDS node elements connected to the SDS root node in block 406. In block 408, an SDS node element corresponding to the TDS element in a key position is processed by a processing resource. The processing includes identifying a transform that should be applied to the SDS node element and applying the transform to the SDS node element to generate a corresponding TDS element in block. In block 410, the processing resource identifies node elements in a lower hierarchy level in the SDS that are connected to the processed SDS node element. In block 412, the processing resource outputs the resultant TDS node element to populate an empty key position in the queue, maps the resultant TDS node element to the TDS, and outputs the identified SDS node elements to the queue positions corresponding to the corresponding populated key position in the queue. In block 414, the processing resource determines whether there are any additional SDS node elements associated with the TDS key position. If no, in block 416, the key position in the queue is expunged and the processing resource is available for processing another key position and associated SDS elements. In block 418, any available processing resource (i.e., a processing resource that is not processing any data in the queue—an idle processing resource) determines whether the queue includes any populated key positions that are not being processed. If no, in block 420 if all processors are idle, and the queue is empty the method ends, and may output the TDS. If in block 418 the queue includes populated key positions that are not being processed, and if a processing resource is available in block 422, the available processing resource associates with a populated unprocessed key position in block 424.

A transform rule is used by the processing resources 302 (of FIG. 3A) to transform a SDS element into the proper TDS element. Since the SDS includes a variety of different types of elements, and each type of element is generally transformed using a different rule, the processing resources 302 typically identify the type of SDS element to be transformed and apply the transform rule associated with the SDS element to transform the SDS element into a corresponding TDS element. The transform rules are stored in a database or lookup table (not shown) that includes a list of SDS element identifiers and transform rules associated with the SDS element identifiers. In one exemplary embodiment, a processing resource 302 may access the lookup table and search for an SDS element identifier that matches the SDS element identifier of the SDS element to be transformed. When the match is found the processing resource 302 retrieves the associated transform rule and applies the rule to the SDS element to transform the SDS element into a corresponding TDS element. Though the above described exemplary embodiment is effective, with a large lookup table of SDS element types and transform rules, the matching processing may slow the overall processing of the SDS element since the serial matching of a single lookup table does not use parallel processing.

Figure 5:
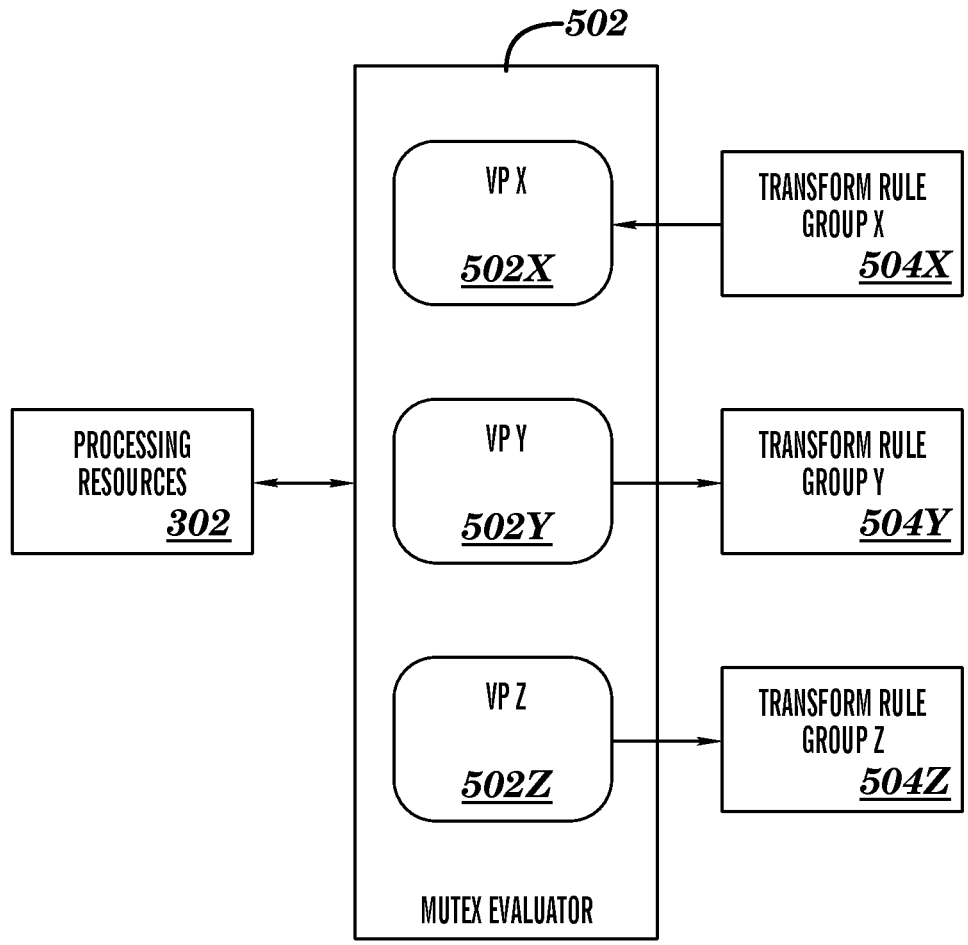
FIG. 5 illustrates an exemplary embodiment of a system.

FIG. 5 illustrates an exemplary embodiment of a system 500 that includes a mutually exclusive (MUTEX) evaluator portion 502 that includes processing resources VP X 502X, VP Y 502Y, and VP Z 502Z. The MUTEX evaluator portion 502 may include any number of processing resources and is not limited to the illustrated embodiment. The MUTEX evaluator portion 502 may be communicatively connected to the processing resources 302. Each of the processing resources 502X-502Z is associated with a transform rule group (TRG) X-Z 504X-Z that includes transform rules. In the illustrated embodiment, each transform rule group includes a different set of transform rules. For example, if there are a total of 99 transform rules that may be used for the mapping of the SDS 202 (of FIG. 2) to the TDS 204, the transform rules may be grouped into three groups of 33 rules such that TRG X 504X includes rules 1-33, TRG Y 505Y includes rules 34-66, and TRG Z 504Z includes rules 65-99. In operation, when a processing resource 302 receives a SDS element such as "Class1," the processing resource 302 identifies the element type of the SDS element. The processing resource 302 sends a request for a transform rule that includes the element identifier to the MUTEX evaluator portion 502. The element identifier is sent to each of the processing resources 502X-Z in the MUTEX evaluation portion 502. Each of the processing resources 502X-Z compares the received element identifier to the element identifiers in the associated TRG 504X-Z. When one of the processing resources 502X-Z finds a match, the processing resource 502 retrieves the transform rule associated with the matched element identifier and sends the transform rule to the requesting processing resource 302. The processing resource 502 notifies the other processing resources that the request has been satisfied, and the processing resources 502X-Z cease searching for matches. The MUTEX evaluator portion 502 may then receive and process another request for a transform rule. The exemplary embodiment may include any number of TRGs 504 each having any number of transform rules.

Figure 6:
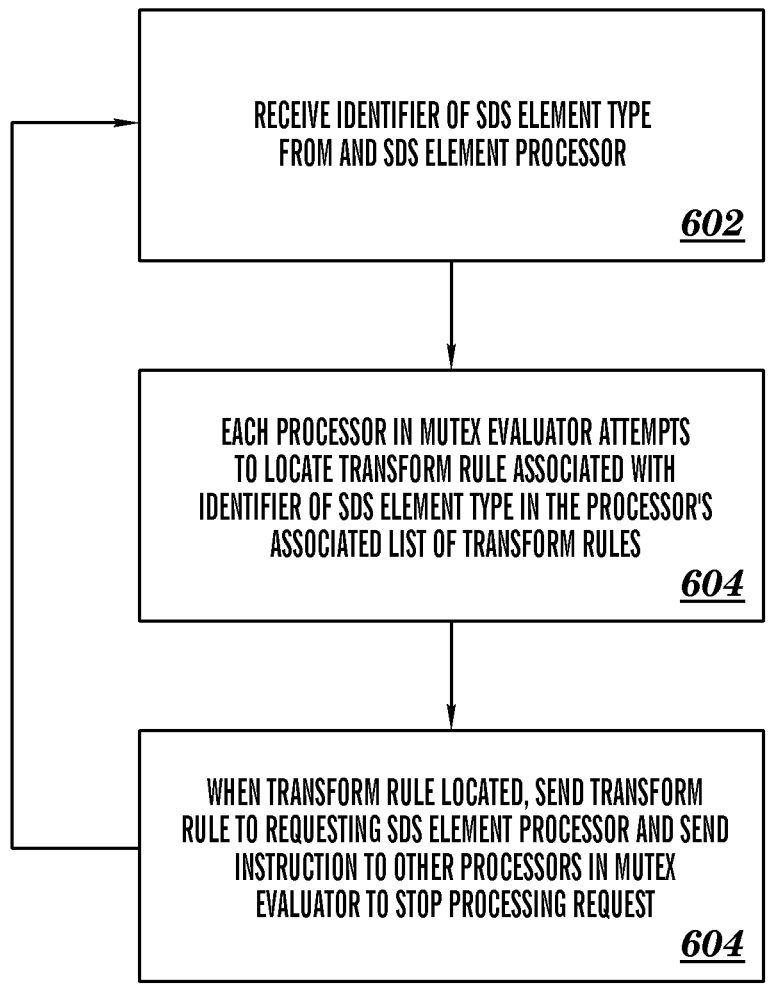
FIG. 6 illustrates a block diagram of an exemplary method for processing transform rule requests.

FIG. 6 illustrates a block diagram of an exemplary method for processing transform rule requests. In block 602, a request is received that includes an identifier of an SDS element type an identifier of the requesting processing resource. In block 604 each processing resource in the MUTEX evaluator portion 502 (of FIG. 5) attempts to locate a transform rule that is associated with the received SDS element type in a list of transform rules that is associated with the processing resource in the MUTEX evaluator portion 502. Each list having at least an SDS element identifier and an associated transform rule. At least one of the lists having a group of transform rules that is different from the other lists. In block 606, when the requested transform rule is located, the transform rule is sent to the requesting processing resource (SDS element processor) and an instruction is sent to the other processing resources in the MUTEX evaluator portion 502 to stop processing the request.

Figure 7:
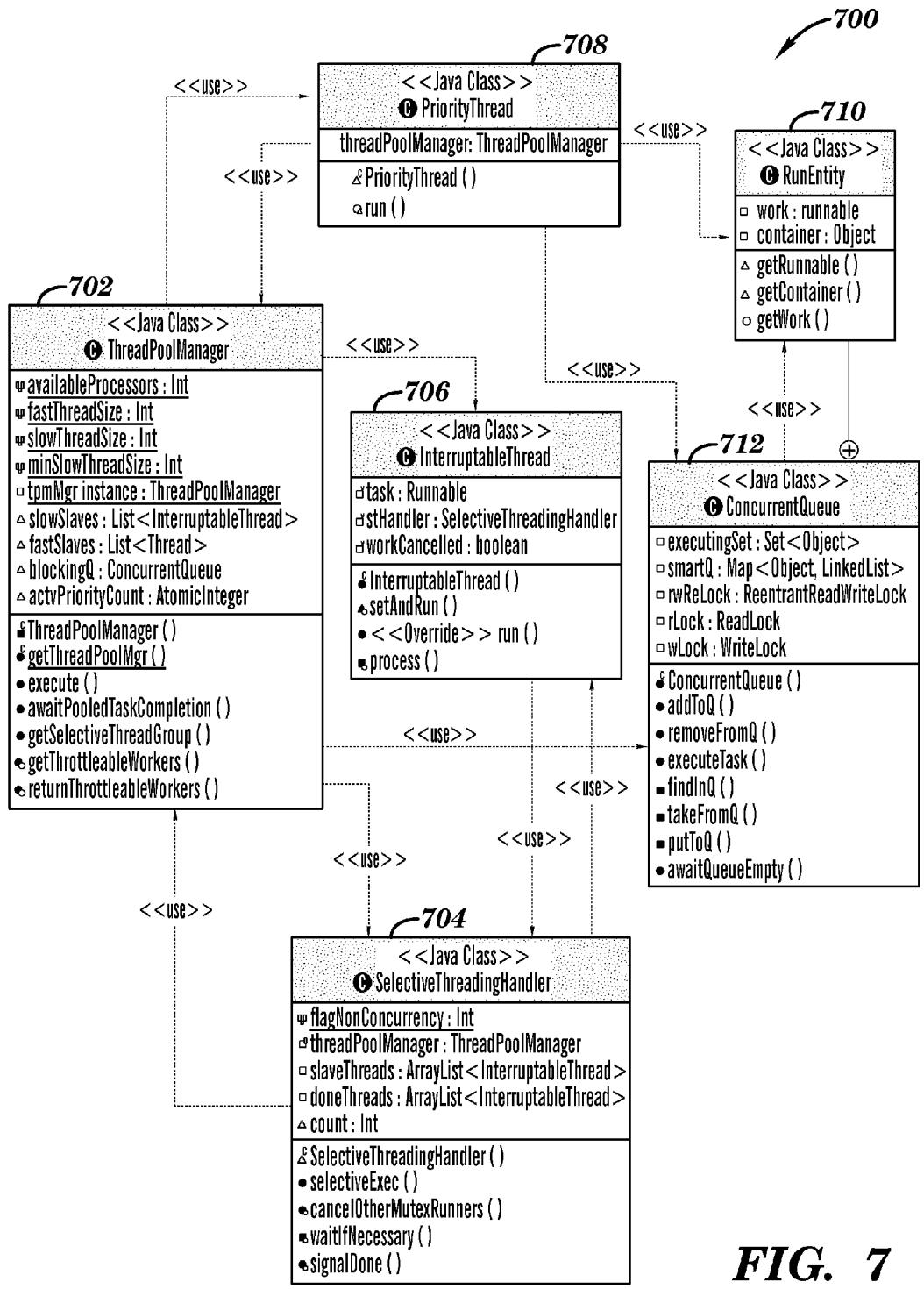
FIG. 7 illustrates an exemplary embodiment of an implementation of a concurrency framework

FIG. 7 illustrates an exemplary embodiment of an implementation of a concurrency framework 700 that performs the methods described above. The illustrated embodiment includes an implementation in Java classes, however the illustrated embodiments are merely an example, and may be implemented in any other programming language. In this regard, the concurrency framework 700 includes a thread pool manager 702, a selective threading handler 704, an interruptible thread 706, a priority thread 708, a run entity 710 and a concurrent queue 712.

Figure 8A:
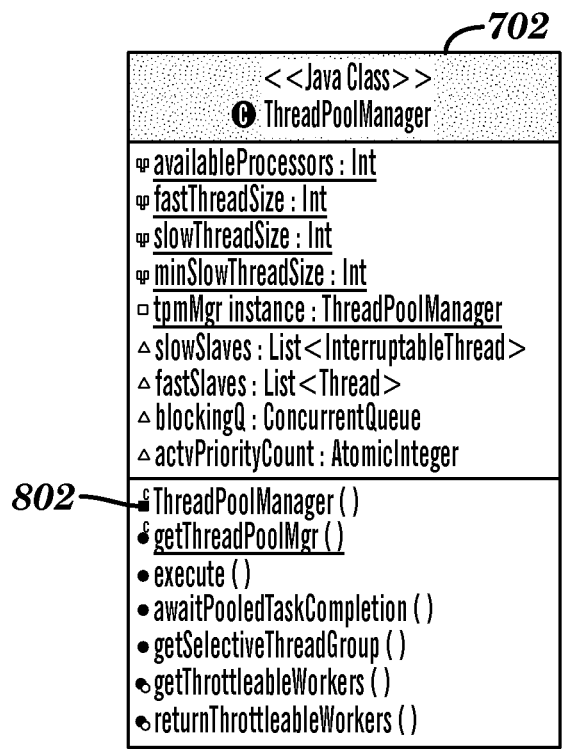
FIG. 8A illustrates the thread pool manager of FIG. 7.

FIG. 8A illustrates the thread pool manager 702, which includes the function ThreadPoolManager ( ) 802. The thread pool manager 702 is responsible for orchestrating the scheduling aspects of the concurrency framework. Particularly, the thread pool manager 702 creates multiple divisions with each division including executors with characteristics that are different from the characteristics of executors in other divisions. FIG. 8B illustrates an exemplary embodiment of the ThreadPoolManager ( ) 802 function that depicts instantiation of two divisions of executors. Priority thread corresponds to the virtual processors A-D (302A-302D of FIG. 3), and serve as the runnable entity for the export agent that participates in concurrent target model creation. The priority threads block on the concurrent queue while awaiting tasks.

Figure 9A:
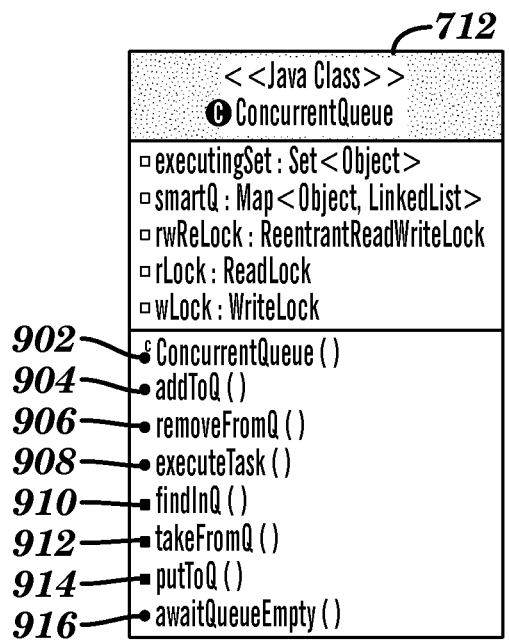
FIG. 9A illustrates the concurrent queue of FIG. 7.

FIG. 9A illustrates the concurrent queue 712. The concurrent queue 712 includes the functions ConcurrentQueue ( ) 902, addToQ ( ) 904, removeFromQ ( ) 906, executeTask ( ) 908, findInQ ( ) 910, takeFromQ ( ) 912, putToQ ( ) 914, and awaitQueueEmpty ( ) 916. FIG. 9B illustrates an exemplary embodiment of the ConcurrentQueue ( ) 902 function and the addToQ ( ) 904 function. The ConcurrentQueue ( ) 902 function allows for the simultaneous fetching and the addition of source input elements for action upon by export agents for concurrent model creation.

FIG. 9C illustrates an exemplary embodiment of the removeFromQ ( ) 906 function. The addToQ ( ) 904 function (of FIG. 9B) and the removeFromQ ( ) 906 function facilitate the simultaneous additions and removals of data from different portions of the queue concurrently. FIG. 9D illustrates an exemplary embodiment of the executeTask ( ) 908 function that is accessed by multiple instances of priority threads. The executeTask ( ) 908 function provides for the simultaneous fetching of tasks depicted in line 94. At line 101, multiple priority threads may use a read lock function to access new tasks from the concurrent queue in cases where the previously executed valued list has been depleted of tasks. At line 117, the blocking mechanism is shown. FIG. 9E illustrates an exemplary embodiment of the findInQ ( ) 910 function, the takeFromQ ( ) 912 function, putToQ ( ) 914 function, and awaitQueueEmpty ( ) 916 function.

Figure 10A:
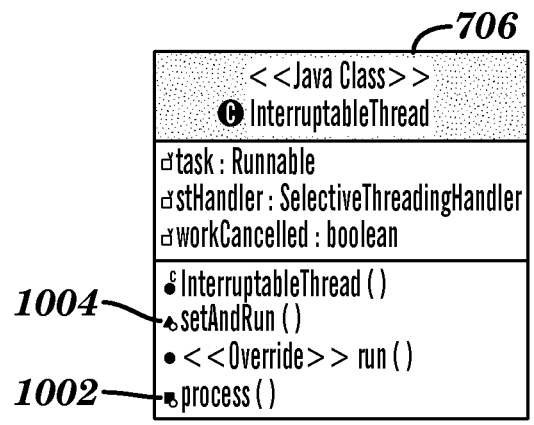
FIG. 10A illustrates the interruptible thread FIG. 7.

FIG. 10A illustrates the interruptible thread 706 that includes a process ( ) 1002 function and a setAndRun ( ) 1004 function. FIG. 10B illustrates an exemplary embodiment of the process ( ) 1002 function, and FIG. 10C illustrates an exemplary embodiment of the setAndRun ( ) 1004 function. The interruptible thread 706 corresponds to the division of executors relating to multiple mutex evaluation and may be throttled to give preference to the concurrent model creating tasks. The process ( ) 1002 function (of FIG. 10B) is the entry point for mutex evaluation, and provides efficient detection of the cancelation of executors on finding a match. The setAndRun ( ) 1004 function delegates tasks to a waiting executor.

Figure 11A:
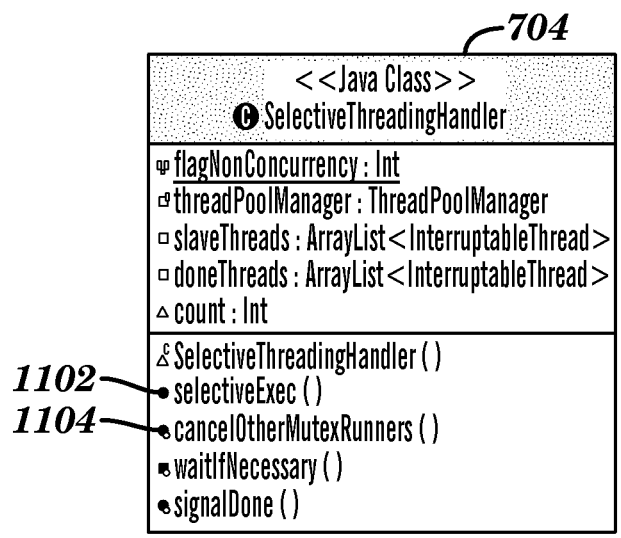
FIG. 11A illustrates the selective threading handler of FIG. 7.

FIG. 11A illustrates the selective threading handler 704, which includes a selctiveExec ( ) 1102 function and a cancelOtherMutexRunners ( ) 1104 function. FIG. 11B illustrates an exemplary embodiment of the selctiveExec ( ) 1102 function, and FIG. 11C illustrates an exemplary embodiment of the cancelOtherMutexRunners ( ) 1104 function. The selective threading handler 704 communicates with the ThreadPoolManager ( ) 802 function (of FIG. 8B) to orchestrate the dynamically morphing scheduling behavior. The number of interruptible threads allowed to exit their waiting state and participate in execution is a subset (throttling) of the total number of interruptible threads in the pool division and is a function of the number of active executors involved in concurrent structure creations. The selctiveExec ( ) 1102 function depicts toggling between the concurrent and sequential mutex evaluation depending on whether the evauation was successful in receiving the executors from the ThreadPoolManager ( ) 802 function. The cancelOtherMutexRunners ( ) 1104 function shares the responsibility of ensuring that other interruptible threads are signaled to abandon their execution if success has been achieved by one of the concurrent mutex evaluators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for transforming data structures, the method comprising:
    processing a portion of a source data structure (SDS) with a first processing resource by:
        associating the first processing resource with a target data structure (TDS) key element located in a key position of a queue, the queue including tasks that transform the SDS to the TDS to perform the associating;
        determining whether the queue includes an SDS node element corresponding to the key position based on whether the SDS node element exists in the key position;
        processing the SDS node element responsive to determining that the queue includes the SDS node element corresponding to the key position, wherein the processing the SDS node element comprises:
            retrieving the SDS node element from the queue;
            processing the retrieved SDS node element to generate a resultant TDS node element;
            outputting the resultant TDS node element to an empty key position in the queue;
            mapping the resultant TDS node element to the TDS;
            determining whether the queue includes a second SDS node element corresponding to the key position; and
            processing the second SDS node element responsive to determining that the queue includes the second SDS node element corresponding to the key position,
        wherein the processing the retrieved SDS node element to generate a resultant TDS node element comprises:
            identifying an SDS element identifier associated with the retrieved SDS node element;
            outputting a request for a transform rule, the request including an identifier of the SDS element identifier associated with the retrieved SDS node element and an identifier of the requesting processing resource;
            receiving a transform rule associated with the SDS element identifier; and
            applying a transform rule corresponding to the identified SDS element identifier to generate the resultant TDS node element.

2. The method of claim 1, further comprising:
    processing a second portion of the SDS with a second processing resource by:
        determining whether the queue includes any populated key positions that are not being processed;
        associating the second processing resource with a TDS key element located in an unprocessed populated key position of the queue;
        determining whether the queue includes an SDS node element corresponding to the unprocessed populated key position;
        processing the SDS node element responsive to determining that the queue includes the SDS node element corresponding to the unprocessed populated key position, wherein the processing the SDS node element comprises:
            retrieving the SDS node element from the queue;
            processing the retrieved SDS node element to generate a resultant TDS node element;
            outputting the resultant TDS node element to an empty key position in the queue;
            mapping the resultant TDS node element to the TDS;
            determining whether the queue includes a second SDS node element corresponding to the key position; and
            processing the second SDS node element responsive to determining that the queue includes the second SDS node element corresponding to the key position.

3. The method of claim 1, further comprising:
    determining with the first processing resource, whether the queue includes any populated key positions that are not being processed responsive to determining that the queue does not include an SDS node element corresponding to the key position;
    associating the first processing resource with a TDS key element located in an unprocessed populated key position of the queue;
    determining whether the queue includes an SDS node element corresponding to the key position;
    retrieving the SDS node element from the queue responsive to determining that the queue includes the SDS node element corresponding to the key position;
    processing the retrieved SDS node element to generate a resultant TDS node element;
    outputting the resultant TDS node element to an empty key position in the queue; and
    mapping the resultant TDS node element to the TDS.

4. The method of claim 1, wherein the processing the retrieved SDS node element to generate a resultant TDS node element comprises:
    identifying an SDS element identifier associated with the retrieved SDS node element; and
    applying a transform rule corresponding to the identified SDS element identifier to generate the resultant TDS node element.

5. The method of claim 1, wherein the processing of the portion of the SDS with the first processing resource is performed in parallel with the processing of the second portion of the SDS with the second processing resource.

6. The method of claim 1, further comprising processing requests for transform rules, wherein the processing requests for transform rules includes:
receiving a request for a transform rule at a third processing resource and a fourth processing resource, the request including an identifier of the SDS element identifier associated with the retrieved SDS node element and an identifier of the requesting processing resource;
processing the request with the third processing resource and the fourth processing resource, the third processing resource is associated with a first list of transform rules and the fourth processing resource is associated with a second list of transform rules, wherein the processing includes:
the third processing resource determining whether the first list of transform rules includes an SDS element identifier matching the received SDS element identifier;
the third processing resource sending a transform rule associated with the SDS element identifier to the requesting processing resource, and [[a]]an indicator to the fourth processing resource indicating that the request has been satisfied responsive to determining that the first list of transform rules includes the SDS element identifier matching the received SDS element identifier;
the fourth processing resource determining whether the second list of transform rules includes an SDS element identifier matching the received SDS element identifier; and
the fourth processing resource sending a transform rule associated with the SDS element identifier to the requesting processing resource, and an indicator to the third processing resource indicating that the request has been satisfied responsive to determining that the second list of transform rules includes the SDS element identifier matching the received SDS element identifier.

7. The method of claim 6, further comprising:
the fourth processing resource ceasing the determination of whether the second list of transform rules includes an SDS element identifier matching the received SDS element identifier responsive to receiving the indicator from the third processing resource indicating that the request has been satisfied.

8. The method of claim 6, wherein the first list of transform rules and the second list of transform rules are dissimilar.

9. The method of claim 6, further comprising:
retrieving a user definable function that defines an allocation of a plurality of processing resources, the plurality of processing resources includes at least the first, second, third, and fourth processing resources; and
allocating the each of the processing resources of the plurality of resources for either processing requests for transform rules or processing portions of the SDS according the user definable function.

10. A system for transforming data structures comprising:
a microprocessor including a queue including target data structure (TDS) key positions and source data structure (SDS) element positions associated with the TDS key positions;
a first processing resource executable by the microprocessor, the first processing resource operative to process a portion of a source data structure (SDS) with a first processing resource by:
associating the first processing resource with a target data structure (TDS) key element located in a key position of a queue, the queue including tasks that transform the SDS to the TDS to perform the associating;
determining via the microprocessor whether the queue includes an SDS node element corresponding to the key position based on whether the SDS node element exists in the key position;
processing the SDS node element via the microprocessor in response to determining that the queue includes the SDS node element corresponding to the key position, wherein the processing the SDS node element comprises:
retrieving the SDS node element from the queue;
processing the retrieved SDS node element to generate a resultant TDS node element;
outputting the resultant TDS node element to an empty key position in the queue;
mapping the resultant TDS node element to the TDS;
determining whether the queue includes a second SDS node element corresponding to the key position; and
processing the second SDS node element responsive to determining that the queue includes the second SDS node element corresponding to the key position,
wherein the processing the retrieved SDS node element to generate a resultant TDS node element comprises:
identifying an SDS element identifier associated with the retrieved SDS node element; and
applying a transform rule corresponding to the identified SDS element identifier to generate the resultant TDS node element.

11. The system of claim 10, further comprising a second processing resource operative to process a second portion of the SDS by:
determining whether the queue includes any populated key positions that are not being processed;
associating the second processing resource with a TDS key element located in an unprocessed populated key position of the queue;
determining whether the queue includes an SDS node element corresponding to the unprocessed populated key position;
processing the SDS node element responsive to determining that the queue includes the SDS node element corresponding to the unprocessed populated key position, wherein the processing the SDS node element comprises:
retrieving the SDS node element from the queue;
processing the retrieved SDS node element to generate a resultant TDS node element;
outputting the resultant TDS node element to an empty key position in the queue;
mapping the resultant TDS node element to the TDS;
determining whether the queue includes a second SDS node element corresponding to the key position; and
processing the second SDS node element responsive to determining that the queue includes the second SDS node element corresponding to the key position.

12. The system of claim 10, wherein the first processing resource is further operative to determine whether the queue includes any populated key positions that are not being processed responsive to determining that the queue does not include an SDS node element corresponding to the key position, associate with a TDS key element located in an unprocessed populated key position of the queue, determine whether the queue includes an SDS node element corresponding to the key position, retrieve the SDS node element from the queue responsive to determining that the queue includes the SDS node element corresponding to the key position, process the retrieved SDS node element to generate a resultant TDS node element, output the resultant TDS node element to an empty key position in the queue, and map the resultant TDS node element to the TDS.

13. The system of claim 10, wherein the processing the retrieved SDS node element to generate a resultant TDS node element comprises:
   identifying an SDS element identifier associated with the retrieved SDS node element;
   outputting a request for a transform rule, the request including an identifier of the SDS element identifier associated with the retrieved SDS node element and an identifier of the requesting processing resource;
   receiving a transform rule associated with the SDS element identifier; and
   applying a transform rule corresponding to the identified SDS element identifier to generate the resultant TDS node element.

14. The system of claim 10, wherein the processing of the portion of the SDS with the first processing resource is performed in parallel with the processing of the second portion of the SDS with the second processing resource.

15. The system of claim 10, wherein the system is further operative to process requests for transform rules, wherein the processing requests for transform rules includes:
   receiving a request for a transform rule at a third processing resource and a fourth processing resource, the request including an identifier of the SDS element identifier associated with the retrieved SDS node element and an identifier of the requesting processing resource;
   processing the request with the third processing resource and the fourth processing resource, the third processing resource is associated with a first list of transform rules and the fourth processing resource is associated with a second list of transform rules, wherein the processing includes:
   the third processing resource determining whether the first list of transform rules includes an SDS element identifier matching the received SDS element identifier;
   the third processing resource sending a transform rule associated with the SDS element identifier to the requesting processing resource, an indicator to the fourth processing resource indicating that the request has been satisfied responsive to determining that the first list of transform rules includes the SDS element identifier matching the received SDS element identifier;
   the fourth processing resource determining whether the second list of transform rules includes an SDS element identifier matching the received SDS element identifier; and
   the fourth processing resource sending a transform rule associated with the SDS element identifier to the requesting processing resource, and an indicator to the third processing resource indicating that the request has been satisfied responsive to determining that the second list of transform rules includes the SDS element identifier matching the received SDS element identifier.

16. The system of claim 15, wherein the fourth processing resource is operative to cease the determination of whether the second list of transform rules includes an SDS element identifier matching the received SDS element identifier responsive to receiving the indicator from the third processing resource indicating that the request has been satisfied.

17. The system of claim 15, wherein the first list of transform rules and the second list of transform rules are dissimilar.

18. The system of claim 15, wherein the system is operative to retrieve a user definable function that defines an allocation of a plurality of processing resources, the plurality of processing resources includes at least the first, second, third, and fourth processing resources, and allocate the each of the processing resources of the plurality of resources for either processing requests for transform rules or processing portions of the SDS according the user definable function.

19. A computer implemented method for processing a request for a transform rule, the method comprising:
   processing a portion of a source data structure (SDS) with a first processing resource by:
   associating the first processing resource with a target data structure TDS key element located in a key position of a queue, the queue including tasks that transform the SDS to the TDS to perform the associating;
   determining whether the queue includes an SDS node element corresponding to the key position based on whether the SDS node element exists in the key position;
   processing the SDS node element responsive to determining that the queue includes the SDS node element corresponding to the key position, wherein the processing the SDS node element comprises:
   retrieving the SDS node element from the queue;
   processing the retrieved SDS node element to generate a resultant TDS node element;
   outputting the resultant TDS node element to an empty key position in the queue;
   mapping the resultant TDS node element to the TDS;
   determining whether the queue includes a second SDS node element corresponding to the key position; and
   processing the second SDS node element responsive to determining that the queue includes the second SDS node element corresponding to the key position,
   wherein the processing the retrieved SDS node element to generate a resultant TDS node element comprises:
   identifying an SDS element identifier associated with the retrieved SDS node element;
   outputting a request for a transform rule, the request including an identifier of the SDS element identifier associated with the retrieved SDS node element and an identifier of the requesting processing resource
   receiving said request from a first processing resource,
   processing the request with a second processing resource and a third processing resource, the second processing resource is associated with a first list of transform rules and the third processing resource is associated with a second list of transform rules, wherein the processing includes:
   the second processing resource determining whether the first list of transform rules includes an SDS element type matching the received SDS element type;
   the second processing resource sending a transform rule associated with the SDS element type to the requesting processing resource, and an indicator to the third processing resource indicating that the request has been satisfied responsive to determining that the first list of transform rules includes the SDS element type matching the received SDS element type;
   the third processing resource determining whether the second list of transform rules includes an SDS element type matching the received SDS element type; and the third processing resource sending a transform rule associated with the SDS element type to the requesting processing resource, and an indicator to the second processing resource indicating that the request has been satisfied responsive to determining that the second list of transform rules includes the SDS element type matching the received SDS element type;

receiving a transform rule associated with the SDS element identifier; and applying a transform rule corresponding to the identified SDS element identifier to generate the resultant TDS node element.

20. The method of claim 19, further comprising the third processing resource ceasing the determination of whether the second list of transform rules includes an SDS element type matching the received SDS element type responsive to receiving the indicator from the second processing resource indicating that the request has been satisfied.

21. The method of claim 19, further comprising the second processing resource ceasing the determination of whether the first list of transform rules includes an SDS element type matching the received SDS element type responsive to receiving the indicator from the third processing resource indicating that the request has been satisfied.

22. The method of claim 19, wherein the first list of transform rules and the second list of transform rules are dissimilar.

* * * * *